United States Patent
Argelli et al.

(10) Patent No.: US 12,163,603 B2
(45) Date of Patent: Dec. 10, 2024

(54) GRIPPING DEVICE

(71) Applicant: F.LLI RIGHINI S.R.L., Ravenna (IT)

(72) Inventors: Franco Argelli, Ravenna (IT); Renzo Righini, Ravenna (IT)

(73) Assignee: F.LLI RIGHINI S.R.L., Ravenna (IT)

( * ) Notice: Subject to any disclaimer, the term of this patent is extended or adjusted under 35 U.S.C. 154(b) by 741 days.

(21) Appl. No.: 17/278,860

(22) PCT Filed: Oct. 11, 2019

(86) PCT No.: PCT/IB2019/058681
§ 371 (c)(1),
(2) Date: Mar. 23, 2021

(87) PCT Pub. No.: WO2020/075126
PCT Pub. Date: Apr. 16, 2020

(65) Prior Publication Data
US 2022/0034428 A1   Feb. 3, 2022

(30) Foreign Application Priority Data

Oct. 12, 2018   (IT) .................. 102018000009414

(51) Int. Cl.
*F16L 1/20*       (2006.01)
*B25B 1/24*       (2006.01)
(Continued)

(52) U.S. Cl.
CPC ............ *F16L 1/207* (2013.01); *B25B 1/2426* (2013.01); *F16L 1/23* (2013.01); *B25B 1/20* (2013.01);
(Continued)

(58) Field of Classification Search
CPC . F16L 1/207; F16L 1/23; F16L 3/1066; F16L 1/202; F16L 37/0915; B25B 1/2426;
(Continued)

(56) References Cited

U.S. PATENT DOCUMENTS 1,405,325 A * 1/1922 Posch ................... B25B 1/2426
                                                    269/258
2,939,197 A * 6/1960 Leven ............... B23B 31/16054
                                                    279/123
(Continued)

FOREIGN PATENT DOCUMENTS

WO      2010061280 A1      6/2010
WO   WO 2017078529 A1 *   5/2017
(Continued)

OTHER PUBLICATIONS

CN-1314232-A; Double-side stabilizer coupled structure of rotary fixture (Year: 2001).*
(Continued)

*Primary Examiner* — Mahdi H Nejad
(74) *Attorney, Agent, or Firm* — Leason Ellis LLP

(57) ABSTRACT

A clamp (1000) designed to axially block an axisymmetric body (CA) by applying radial actions (forces) and provided with a plurality of gripping devices (1) distributed concentrically around an axis (AX) and developed along a given direction (D) to apply radial actions (forces) centered on said central axis (AX); each device (1) comprising a support assembly (10) and a gripping assembly (20) coupled by means of a plate (22) that supports at least one holding unit (200) at the front; each holding unit (200) comprising at least one toothed sliding block (202) carried in a freely rotatable and axially fixed way and axial-hinge coupling members (30) arranged between the plate (22) and each sliding block (202) and distributed along the direction (D).

10 Claims, 8 Drawing Sheets

(51) Int. Cl.
  *F16L 1/23*    (2006.01)
  *B25B 1/20*    (2006.01)
  *F16L 3/10*    (2006.01)
(52) U.S. Cl.
  CPC ........... *B25B 1/2452* (2013.01); *F16L 3/1066* (2013.01); *Y10T 279/1986* (2015.01)
(58) Field of Classification Search
  CPC ....... B25B 1/20; B25B 1/2452; Y10T 279/19; Y10T 279/1986; B23B 31/16279; B23B 31/16275; B23B 31/16; B23B 31/16283
  USPC .................. 279/110, 123; 269/258, 261, 155
  See application file for complete search history.

(56) References Cited

U.S. PATENT DOCUMENTS

| | | | | |
|---|---|---|---|---|
| 4,969,638 | A * | 11/1990 | Yang | B25B 1/2426 269/261 |
| 5,984,321 | A * | 11/1999 | Gruttadauria | B23B 31/16275 279/123 |
| 6,568,694 | B1 * | 5/2003 | White | B23B 31/16275 269/224 |
| 11,859,735 | B2 * | 1/2024 | Righini | F16L 3/1066 |
| 2012/0177443 | A1 * | 7/2012 | Baylot | F16L 1/23 405/168.4 |

FOREIGN PATENT DOCUMENTS

| | | |
|---|---|---|
| WO | 2018147735 A1 | 8/2018 |
| WO | 2018167660 A1 | 9/2018 |

OTHER PUBLICATIONS

AT-506147-A1; Positioning Device for Fixing a Workpiece (Year: 2009).*

International Search Report and Written Opinion Received for the PCT Application No. PCT/IB2019/058681, Mailed on Feb. 4, 2020, 10 pages.

* cited by examiner

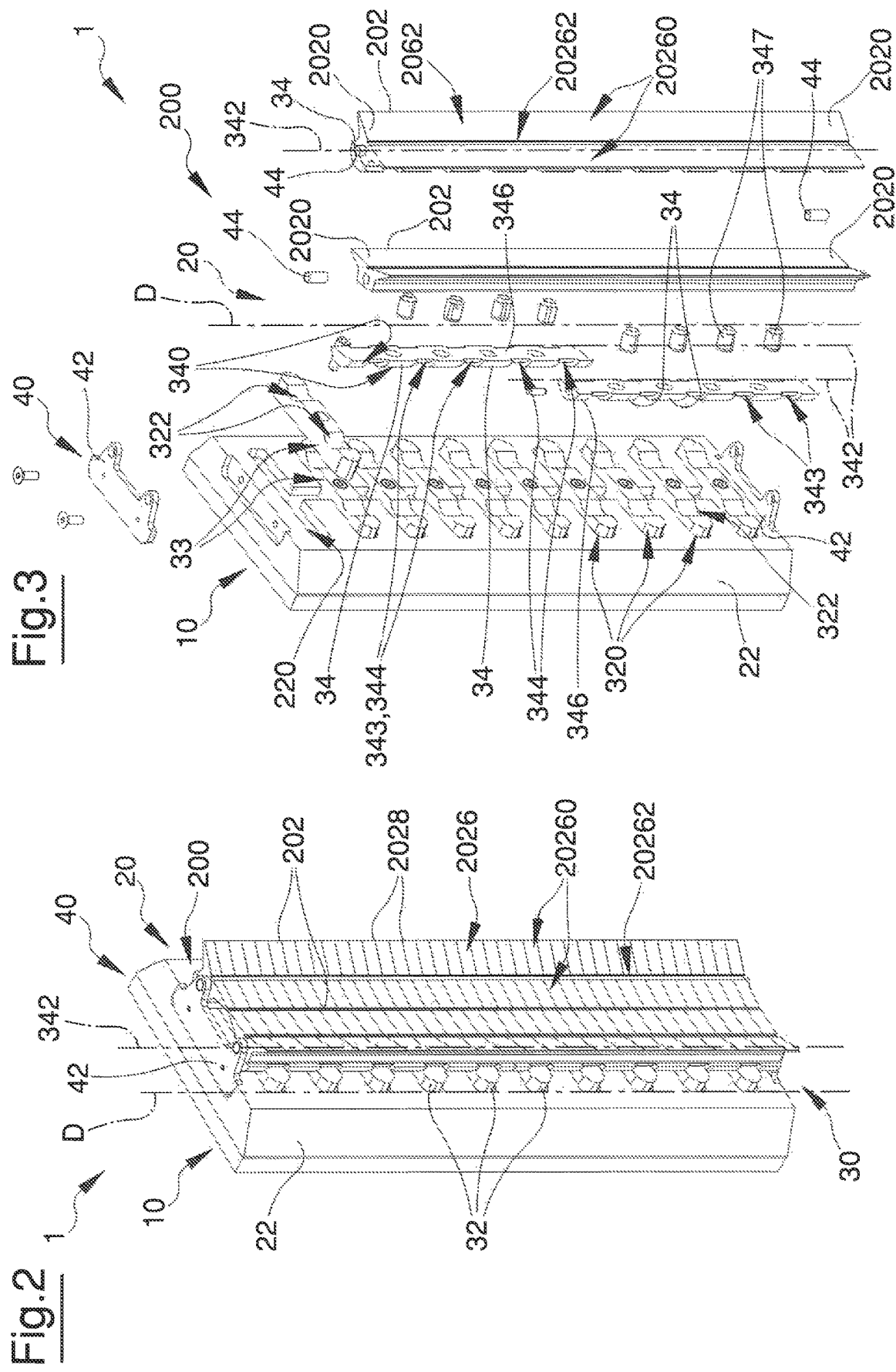

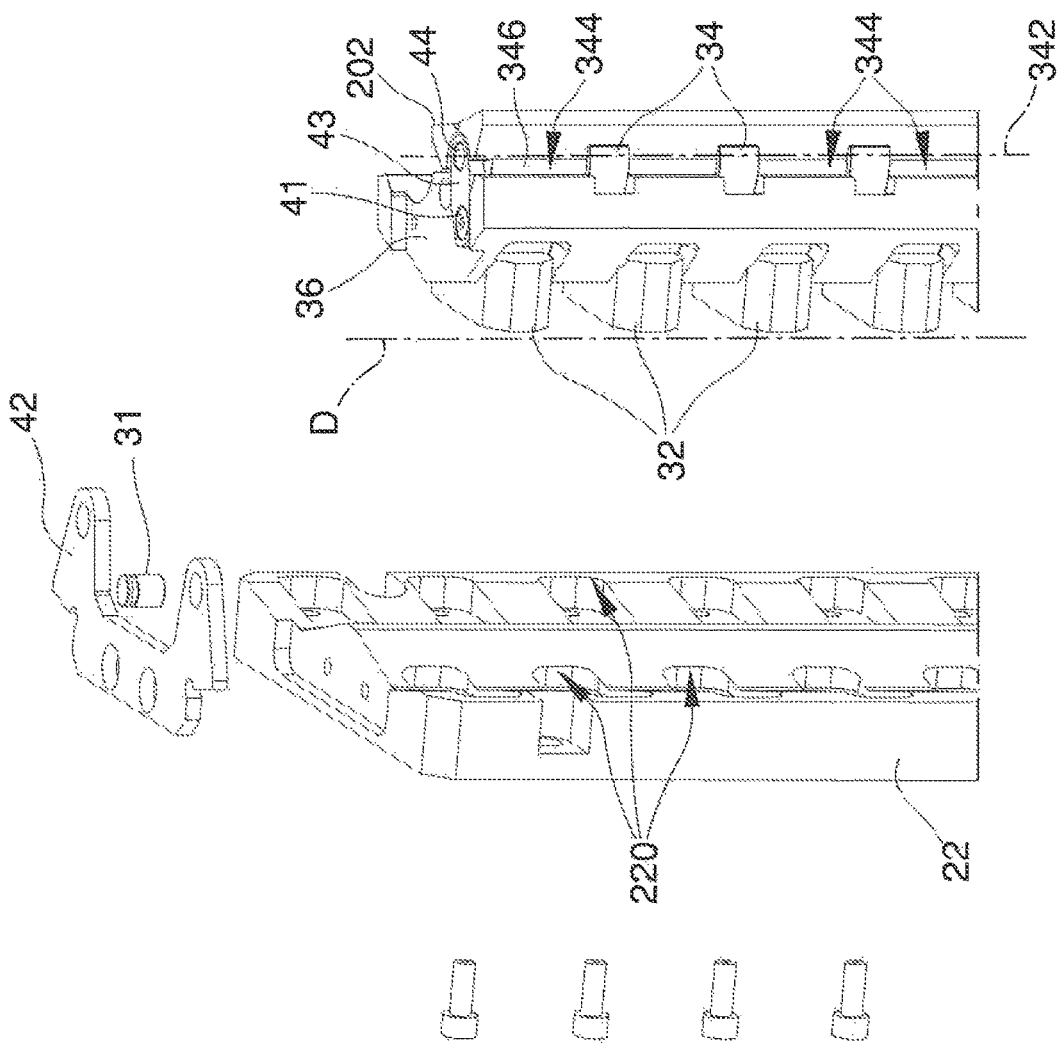
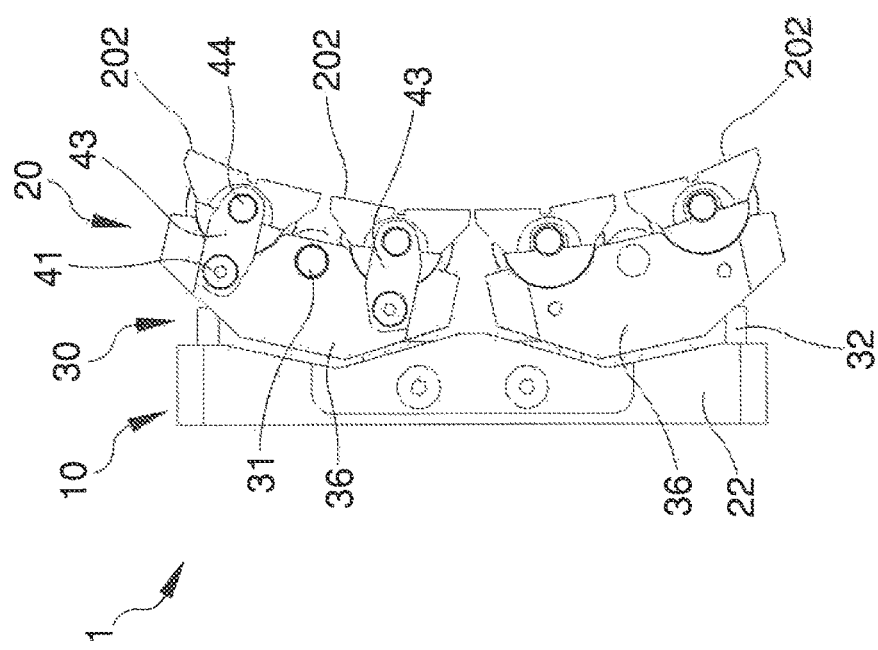

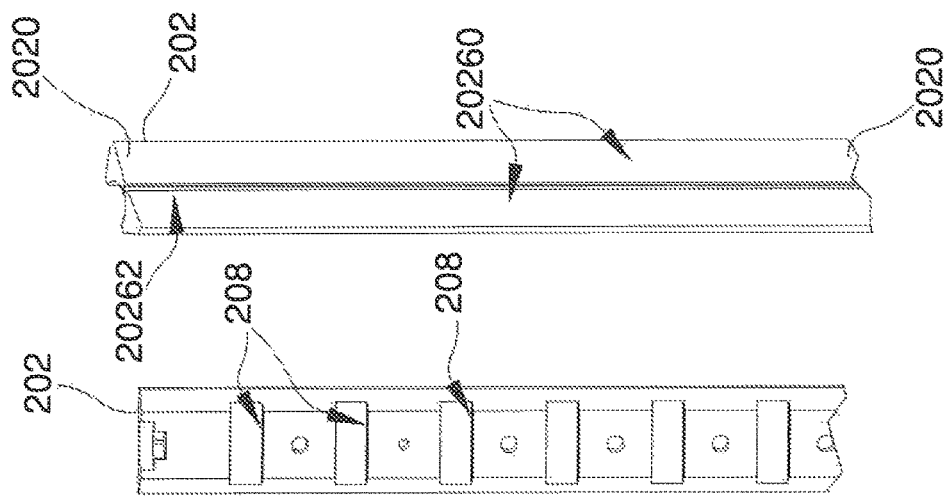
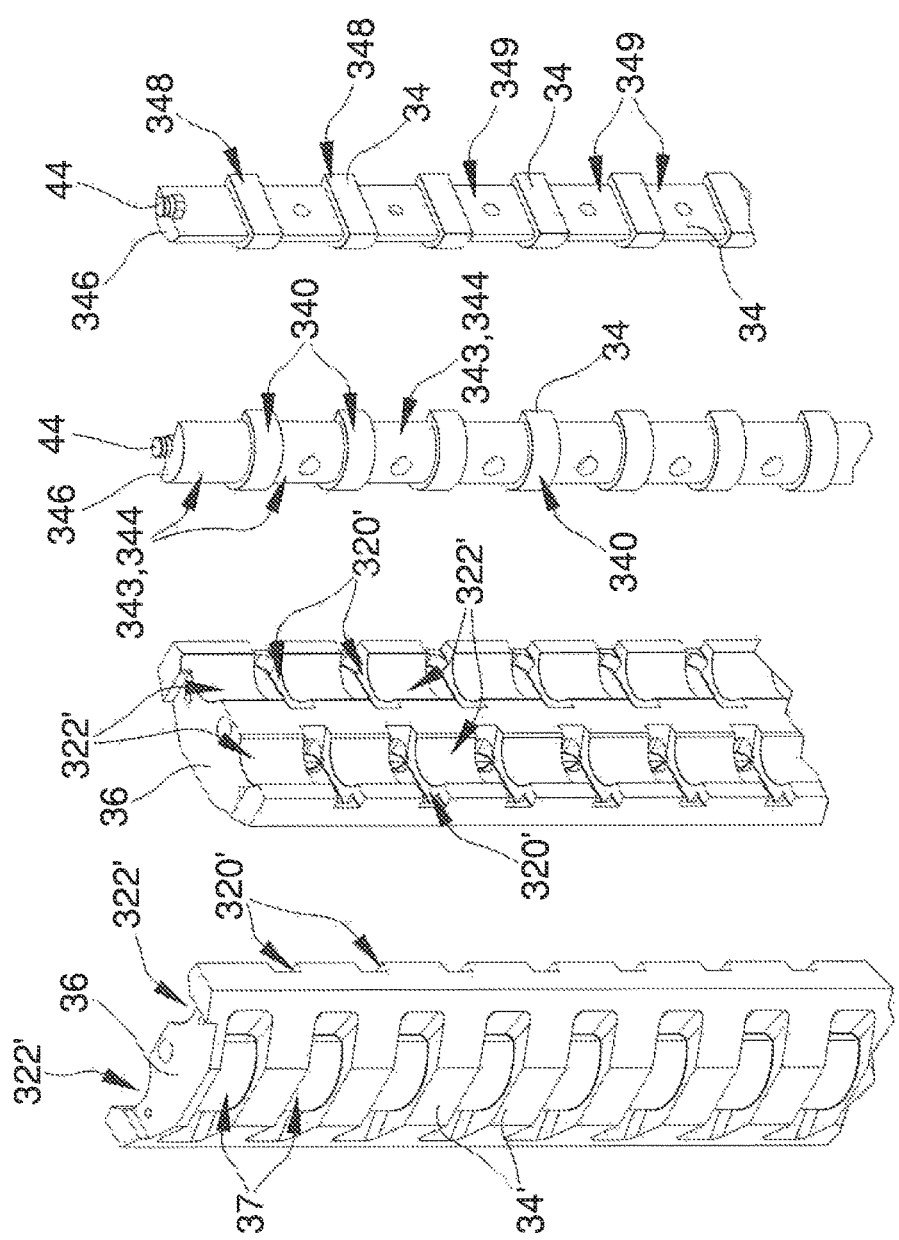

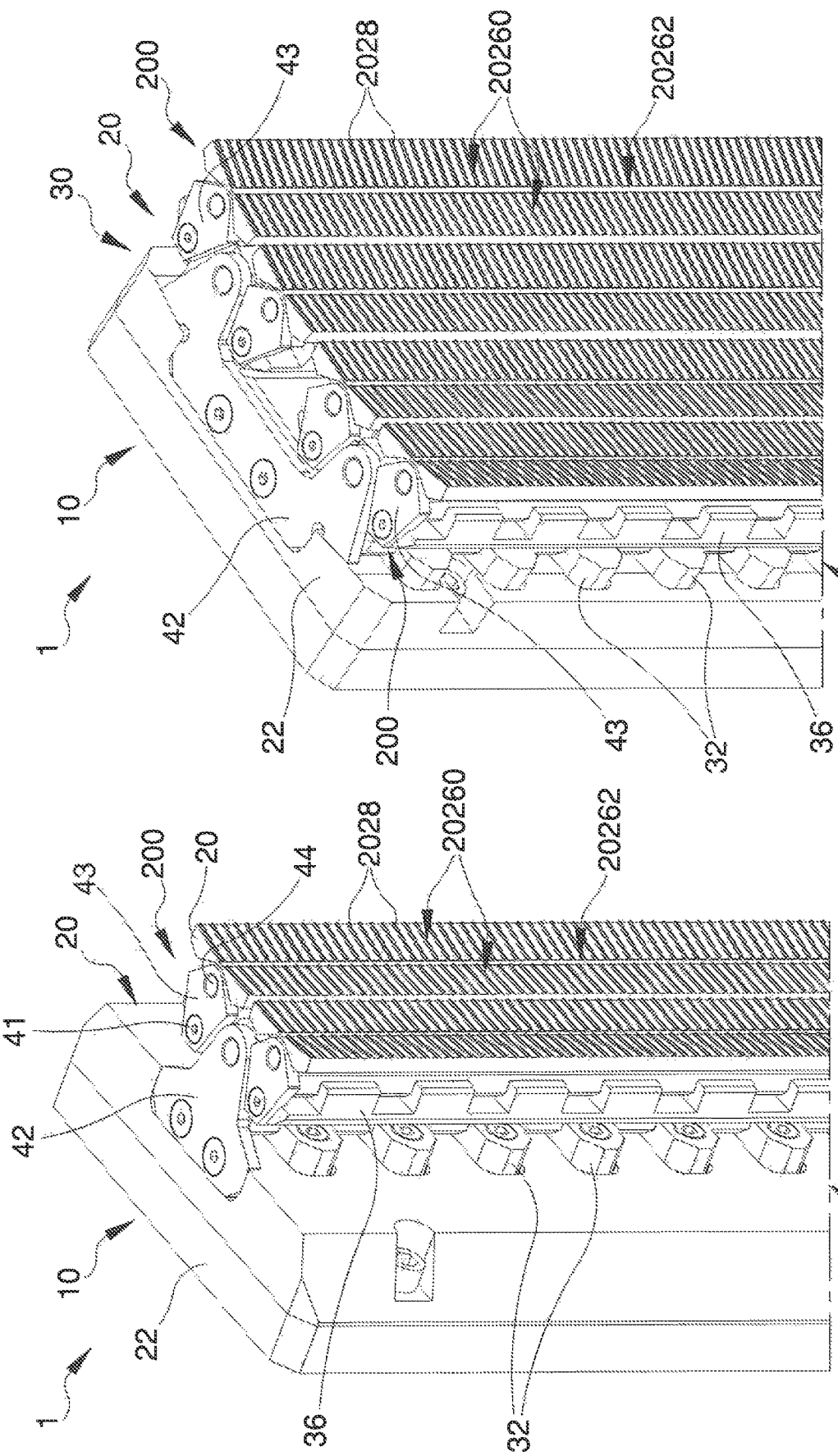

GRIPPING DEVICE

CROSS REFERENCE TO RELATED APPLICATION

This application claims benefit under 35 U.S.C. § 371 to international application No. PCT/IB2019/058681, filed on Oct. 11, 2019, which claims priority to Italian application no. 102018000009414, filed Oct. 12, 2018, the contents of which are incorporated by reference in their entireties.

FIELD OF INVENTION

The present invention relates to a gripping device. In particular, the present invention relates to a gripping device that can be used to axially block axisymmetric bodies subjected to axial stresses. More in detail, the present invention relates to a gripping device that can be used to axially block axisymmetric bodies subjected to axial stresses by means of a plurality of gripping members with radial action and arranged circumferentially.

DESCRIPTION OF THE PRIOR ART

In the field of the construction of pipelines for transporting fluids, electricity or data, in a terrestrial or marine environment, the use of pipes of given length, which are joined at the respective ends to obtain the continuity of the pipeline, is known. In the case of undersea pipelines, the pipes are launched by a ship provided with a gripping device, which is used to hold the end of the last segment of pipe already launched to which another pipe still to be launched must be joined. Each pipe is normally made of a metal material coated externally with a plastic material, or also more simply protected with a thick layer of epoxy paints.

In these cases, the axial stresses that act on the last pipe launched, which are schematically given by the combination of the respective suspended mass and by the longitudinal action exerted by movements of the ship that is laying the pipeline, call be particularly significant, even up to values close to 2000 tons (Mg). In this case, the hold is implemented by applying radial loads to the pipes being laid through at least one clamp, which comprises a plurality of gripping devices arranged peripherally and, in turn, on several layers. The axial force resulting from these radial actions (forces) is proportional to the friction coefficient that is generated in use between the sliding blocks of the gripping device and the sheath that externally covers the pipe and with which these sliding blocks interface.

The Applicant has already dealt with this subject in the patent IT1405435, in the corresponding patent application PCT/IB2018/051655 and in the patent application WO 2018/167660, the teachings of which are thus considered known and, as the other teachings resulting from prior art patents.

One of the problems that occur in the use of these clamps, above all when there are high loads, is represented by the dimensions of the clamps in the longitudinal direction of the pipe and in radial direction, beyond which the deterioration of the pipe and in particular of its plastic coating following application of the radial and tangential load according to the methods described above must be considered.

It is easily understood that it would be advantageous to have a clamp provided with a plurality of gripping devices shaped to maximize the friction coefficient between the gripping members and the pipe (in order to reduce the overall dimensions of these clamps) and minimize the deterioration of the external sheath of the pipes of the pipelines to be constructed. Other conditions being equal, it would also be useful to have a clamp provided with a plurality of gripping devices with reduced radial dimensions and which allow uniform distribution of the load applied radially to the segments of pipe.

SUMMARY

The present invention relates to a gripping device. In particular, the present invention relates to a gripping device that can be used to axially block axisymmetric bodies subjected to axial stresses. More in detail, the present invention relates to a gripping device that can be used to axially block axisymmetric bodies subjected to axial stresses (forces) through a plurality of gripping members with radial action and arranged circumferentially.

The problems set forth above are overcome by means of the present invention according to at least one of the appended claims.

According to an embodiment, the present invention relates to a gripping device for a clamp having a central axis and designed to axially block an axisymmetric body by applying radial actions centred on said central axis; said device having a given angular extension, extending in a given direction parallel to said axis and comprising a support assembly and a gripping assembly coupled through a plate that delimits said gripping assembly at the rear and supports at least one holding unit at the front; each said holding unit comprising at least one toothed sliding block carried in a freely rotatable and axially fixed way with respect to said direction; each said holding unit comprising hinged coupling means axially distributed along said direction and arranged between said plate and each said sliding block.

According to an embodiment, said coupling means comprise tabs carried at the front by said plate and abutment elements carried at the rear by said sliding block shape-fitted to said tabs.

According to an embodiment, said tabs are carried by said plate in a removable way to define a plurality of first compartments distributed along said direction and said abutment elements are distributed along said direction and each axially engaging a said first compartment; each said abutment element being delimited by a partially cylindrical surface centered on a fulcrum axis and facing said plate.

According to a possible design variant of the present invention, each said tab has a concave seat with cylindrical shape at the front; said abutment elements being axially distributed and delimiting longitudinally, two-by-two, a second compartment transversely delimited by a partially cylindrical sheath concentric with said fulcrum axis and having an axial extension that approximates, by excess, that of said first compartment.

According to an embodiment of the present invention, said gripping device comprises radial reference means that comprise a pair of lids carried by said plate at its ends on longitudinally opposite sides and a pair of pins which engage each said sliding block in respective end portions coaxially with said fulcrum axis.

According to an embodiment, said axial-hinge coupling means comprise an elongated member that incorporates at the rear said abutment elements and said second compartments and is made in a single piece with, or is rigidly coupled to, said sliding block on the side of said plate.

According to an embodiment, said tabs are made of steel or a material with antifriction characteristics that, if in use, is coupled to steel; said abutment elements being made of steel or of a material with antifriction characteristics where, if in use, this material is coupled to steel.

According to an embodiment, said coupling means comprise a ribbed body interposed between said plate and said sliding block; said ribbed body being shaped for hinged coupling to said plate and to said elongated member and between said tabs and said abutment elements.

According to a particular embodiment, said ribbed body has, at the rear, third toothed members each of which being designed to engage a said first compartment, said ribbed body also having a recess designed to be shape-fitted to said concave seat and, at the front, a plurality of housings each being shaped in a way similar to said first compartment for housing said abutment element.

According to an embodiment, each said sliding block is delimited at the front by a face provided with a plurality of teeth arranged transversally with respect to said given direction for the entire transversal extension of said sliding block; each said tooth having a substantially triangular, or even rectangular, cross-section.

According to an embodiment, said face has a substantially prismatic and concave shape and has at the front two longitudinal portions connected by a longitudinal groove; each said longitudinal portion being flat or convex or concave and having a longitudinal extension that is substantially identical to a longitudinal encumbrance of said plate.

The present invention also relates to a clamp to axially block an axisymmetric body by applying radial actions; said clamp comprising a plurality of gripping devices distributed concentrically about an axis and developed along a given direction; each said gripping device having a support assembly and a gripping assembly coupled by means of the interposition of connection means; said clamp having a driving assembly for each said gripping device; each said driving assembly being designed to alternatively move the respective said support assembly between a retracted inactive position and an advanced active position transversal to said given direction; each said gripping device having a support coupled to a respective said driving assembly via a ball-joint.

Any further embodiments of the present invention are defined by the claims.

BRIEF DESCRIPTION OF THE FIGURES

Further characteristics and advantages of the clamp and of the respective gripping device according to the present invention will be more apparent from the following description of respective non-limiting embodiments represented in the drawings, wherein identical or corresponding parts of the same device are identified by means of the same reference numbers. In particular:

FIG. 2 is a schematic perspective view on an enlarged scale of a first preferred embodiment of a device of FIG. 1 with parts not represented for clarity;

FIG. 3 is an exploded view of FIG. 2 on an enlarged scale;

FIG. 6 is a plan view of FIG. 5 on an enlarged scale and with parts not represented for clarity;

FIG. 7 is a first exploded view of FIG. 5 with parts not represented for clarity;

FIG. 9 is a schematic perspective view of a first detail taken from FIG. 8;

FIG. 10 is a schematic perspective view of a second detail taken from FIG. 8;

FIG. 11 is a schematic perspective view of a further detail taken from FIG. 8;

FIG. 12 is a schematic perspective view on an enlarged scale of a fourth preferred embodiment of FIG. 2;

FIG. 13 is a schematic perspective view on an enlarged scale of a fifth preferred embodiment of FIG. 2;

DETAILED DESCRIPTION

Figure 1:
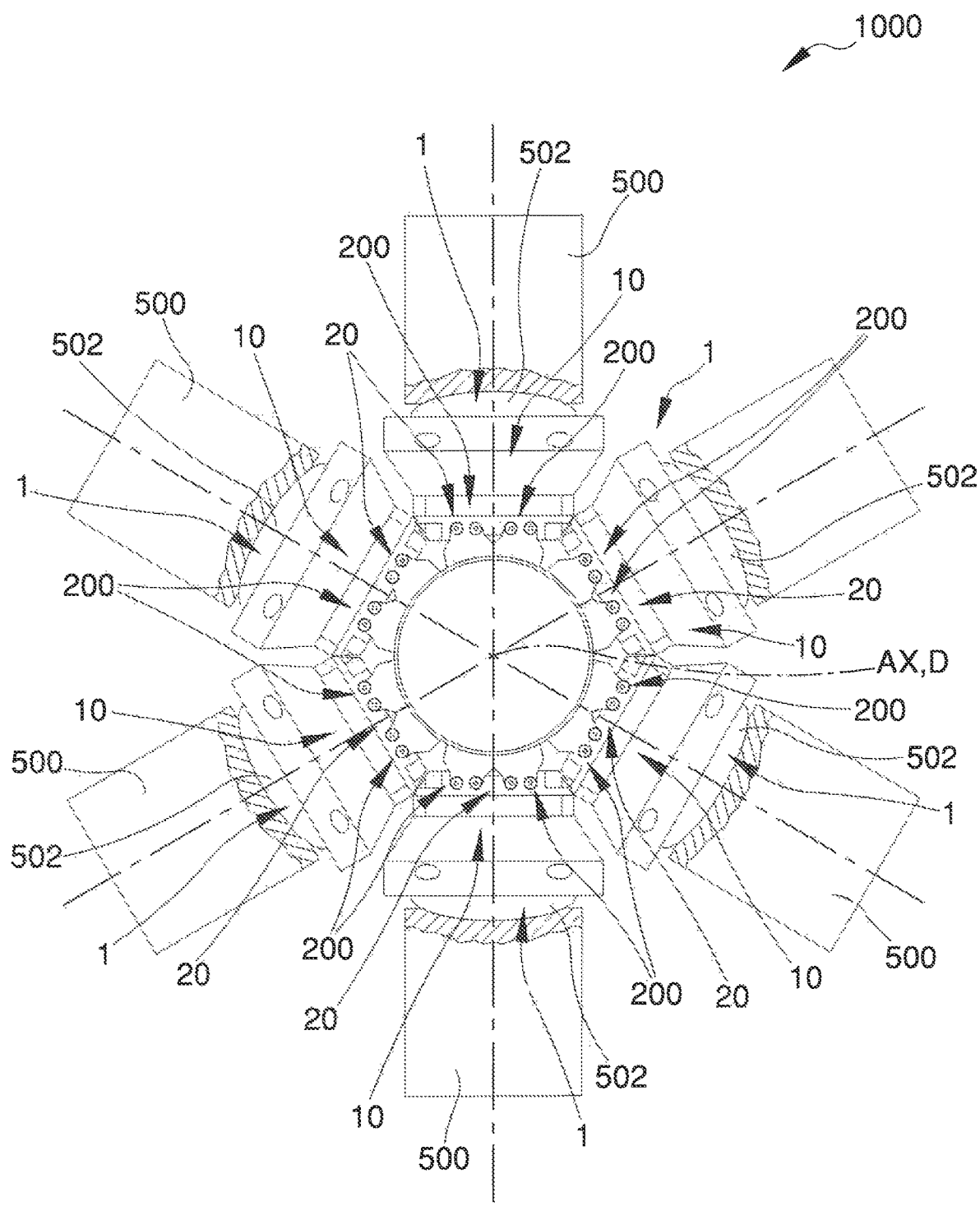
FIG. 1 is a schematic plan view, with parts removed for clarity, of a clamp according to the present invention.

In FIG. 1 the number 1000 indicates, as a whole, a clamp having a central axis AX which can be used to axially block axisymmetric bodies CA by applying radial actions (forces, in particular thrust and/or pressure) centered on the axis AX. These axisymmetric bodies CA can be cylindrical, umbilical or similar-shaped pipes, without this limiting the scope of the present invention. This clamp 1000 comprises a plurality of gripping devices 1 which each having a given angular extension, are distributed circumferentially about the axis AX at given angular distances and extend along a given direction D, substantially parallel to the central axis AX. In FIG. 1 the gripping devices 1 are six (6) in number and arranged at a constant angular pitch purely for convenience in the drawing and without this limiting the scope of the present invention.

With particular reference to FIG. 2, each gripping device 1 has a support assembly 10 and a gripping assembly 20 coupled by means of a substantially pyramid-shaped plate 22 with the upper and lower faces parallel to each other to delimit the gripping assembly 20 at the rear. Each gripping assembly 20 supports at least one holding unit 200 at the front, each of which is provided with at least one toothed sliding block 202 that develops along the direction D and is carried in a freely rotatable and axially fixed way with respect to said direction D, as described in greater detail below.

Again, with reference to FIG. 1, the clamp 1000 associates with each gripping device 1 a driving assembly 500 which is orientated radially, hence transversally to the axis AX, and is coupled to the respective gripping device 1 by means of the interposition of a ball joint 502. Each driving assembly 500 is designed to alternatively move the respective support assembly 10 transversally to the axis AX between a retracted inactive position and an advanced active position, in which the sliding blocks 202 of the gripping device 1 are in contact with the external sheath of the body CA being gripped.

With particular reference to FIGS. 2 and 3, each holding unit 200 comprises coupling members 30 shaped similarly to an axial-hinge arranged between said plate 22 and each sliding block 202 and distributed regularly spaced along said direction D. These coupling members 30 comprise flat bars 32 substantially parallelepiped shaped and vertically delimited by flat side surfaces 33, hence designed to operate similarly to tabs, as clarified in detail hereunder. The tabs 32 are carried at the front regularly spaced by the plate 22 and by abutment elements 34, in turn carried at the rear by the sliding block 202 and shaped to be shape-fitted to the tabs 32, in particular axially and radially, as better described hereunder.

As can be seen from FIG. 3, the tabs 32 are carried by the plate 22 inside seats 220 arranged regularly spaced and made at the front in the plate 22 in a removable way by means of screws. In this way, the horizontal side surfaces 33 that in FIG. 3 vertically delimit the tabs 32 define axial abutment surfaces for the abutment elements 34 and axially delimit a plurality of first transversal compartments 320 distributed along the direction D. To simplify the drawing only one of the side surfaces 33 is indicated in FIG. 3.

Moreover, the abutment elements 34 are also distributed regularly spaced along the direction D and each of them axially engages a first compartment 320. Each abutment element 34 is delimited by a surface 340 facing the plate 22. The solution described allows the axial loads acting on the body CA to be distributed uniformly between the tabs 32 and the abutment elements 34.

It is easily understood that it can be particularly advantageous for the tabs 32 and/or the abutment elements 34 to be made of steel, bronze, or any material with antifriction characteristics in consideration of the conditions of use, taking into account the material with which the tabs 32 and the relative abutment elements 34 are made.

Again, with reference to FIG. 3, each tab 32 has a concave seat 322 with a substantially cylindrical shape at the front. The abutment elements 34 are axially distributed and delimit longitudinally, two-by-two, a second compartment 343 which is in turn transversally delimited by a partially cylindrical sheath 344, which shape-engages a seat 322. This sheath 344 is concentric with the fulcrum axis 342 and has an angular extension that approximates, by excess, an angular extension of the seat 322.

Each gripping device 1 comprises axial reference members 40 which comprise a pair of lids 42 carried by said plate 22 at its ends on longitudinally opposite sides and a pair of pins 44 which engage each sliding block 202 in respective end portions 2020 coaxially with the fulcrum axis 342.

Again with reference to FIGS. 2 and 3, the coupling members 30 comprise an elongated member 346 that incorporates at the rear the abutment elements 34 and the second compartments 343, besides being rigidly coupled to the sliding block 202 on the side of the plate 22 by means of a plurality of coupling members 347 of selectively removable type. For convenience in the drawing, this elongated member 346 is illustrated in FIG. 3 divided into two substantially identical half-parts, without this limiting the scope of the present invention.

Each sliding block 202 is delimited at the front by a face 2026 provided with a plurality of teeth 2028 arranged transversally to the direction D for the entire transversal extension of the sliding block 202. Each tooth 2028 (more clearly shown in FIGS. 12 and 13) can have a substantially triangular, or even rectangular, cross-section, according to the type of use.

Each face 2026 has a substantially prismatic and concave shape and can be divided into two longitudinal portions 20260 by a longitudinal median groove 20262. Each portion 20260 has been represented as flat in the accompanying figures, but can indifferently be flat, convex or concave according to the requirements of use of the clamp 1000.

The use of the clamp 1000 and of the gripping devices 1 of which it is composed can be easily understood from the description above and do not require further explanation. However, it might be useful to specify that the particular choice to couple each sliding block 202 in an jointed/tilting way with respect to the plate 22 makes it possible to circumferentially distribute the load exerted radially on the body CA by each gripping device 1 in a substantially uniform way on the faces 2026 of the sliding blocks 202 of the clamp 1000 engaged in gripping the body CA. In this way, the load is uniformly distributed for each face 2026, thus where the stress of the external sheath of the body CA is circumferentially uniform.

Moreover, as can be seen in FIG. 2, the faces 2026 extend in a substantially identical way to the longitudinal extension of the plate 22, hence as can be seen in the accompanying figures, of the gripping device 1; therefore, the radial action exerted on the sheath of the body CA is distributed over an area that develops for the entire transversal and longitudinal extensions of each gripping device 1. In this way, several clamps 1000 can be used substantially in axial contact without this causing interference between the respective sliding blocks 202, and with the effect of maximizing the transversal and axial extension of the area of contact with the sheath of the body CA being gripped.

Finally, it is clear that modifications and variants can be made to the clamp 1000 and to each respective gripping device 1 described and illustrated herein without departing from the scope of the present invention.

Figure 5:
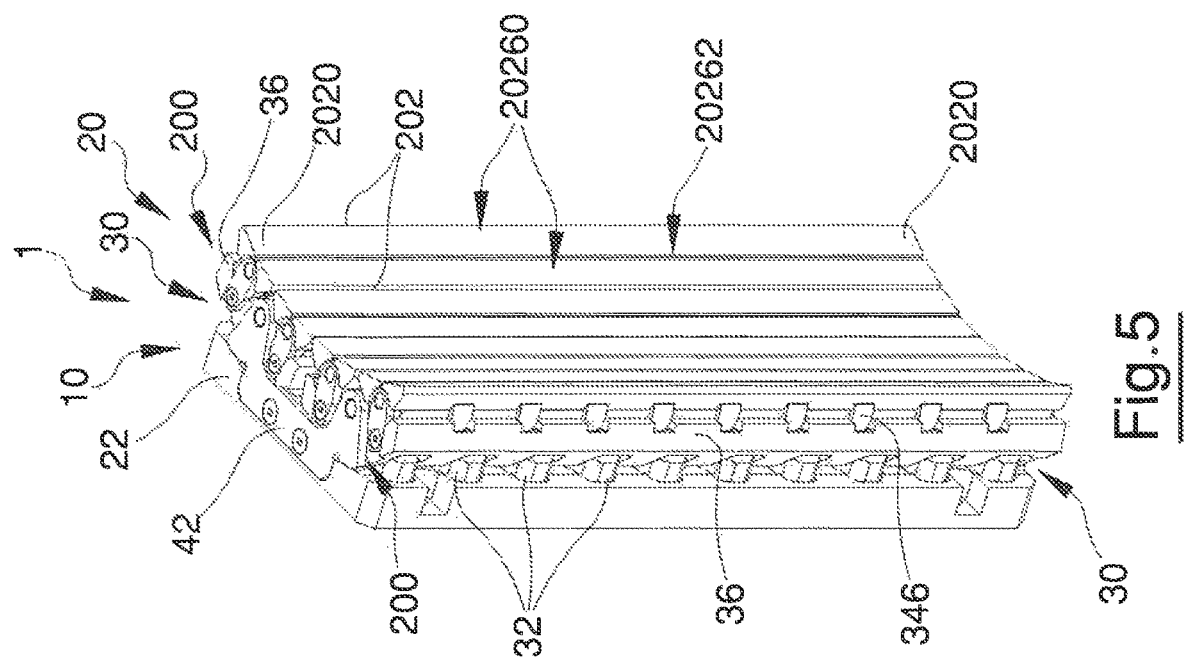
FIG. 5 is a schematic perspective view on an enlarged scale of a third preferred embodiment of FIG. 2.
Figure 4:
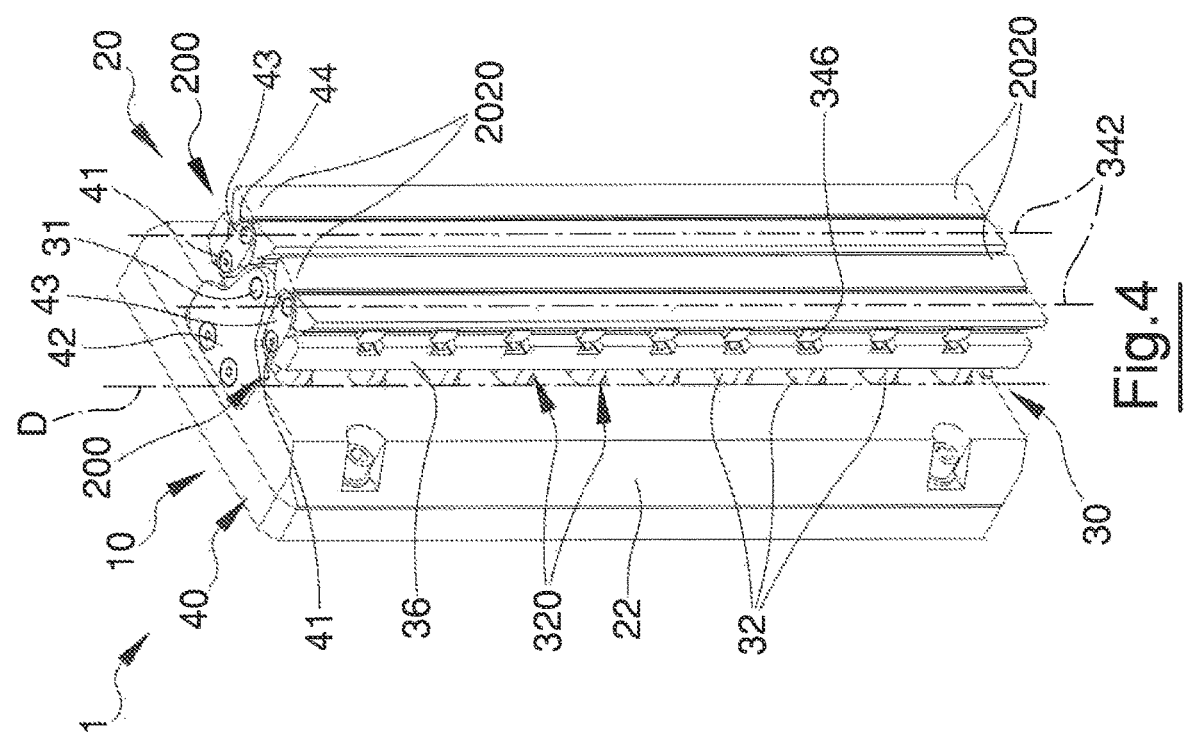
FIG. 4 is a schematic perspective view on an enlarged scale of a second preferred embodiment of a device of FIG. 1 with parts not represented for clarity.

For example, with reference to FIG. 4, it is possible to modify the gripping device 1 of FIG. 3 by increasing the degrees of freedom of rotation of the sliding blocks 202, in order to improve the capacity to copy or to adapt to the position of the external surface of the bodies CA to be held with respect to the position of the holding unit 200 that grips them. In particular, in this case the coupling members 30 comprise a ribbed body 36 interposed between the plate 22 and the sliding block 202. This ribbed body 36 is shaped for hinged coupling to the plate 22 and to the elongated member 346 between the tabs 32 and the abutment elements 34. Coupling between the ribbed body 36 and the plate 22 is guaranteed by the tabs 32 and by lids functionally identical to the lids 42 of the previous version described with reference to FIGS. 2-3, and by a pin 31 and for this reason indicated (only one in FIG. 4) with the same reference number. Moreover, each sliding block 202 is kept in hinge position with respect to the ribbed body 36 by two screws 41 and by two pins 44, as well as by a small plate 43 that connects them, remaining incorporated in the end shapes of the ribbed body 36 and of the sliding block 202, so as not to increase the longitudinal dimensions of the gripping device 1. FIG. 5 shows a version with two holding units 200 of FIG. 4. Greater construction details of these solutions are shown with reference to FIGS. 6-11, which indicate in views with different degrees of explosion the version of FIG. 5, the purpose of which is to improve the uniformity of the load distribution exerted on the external sheath of the body CA by the clamp 1000.

Figure 8:
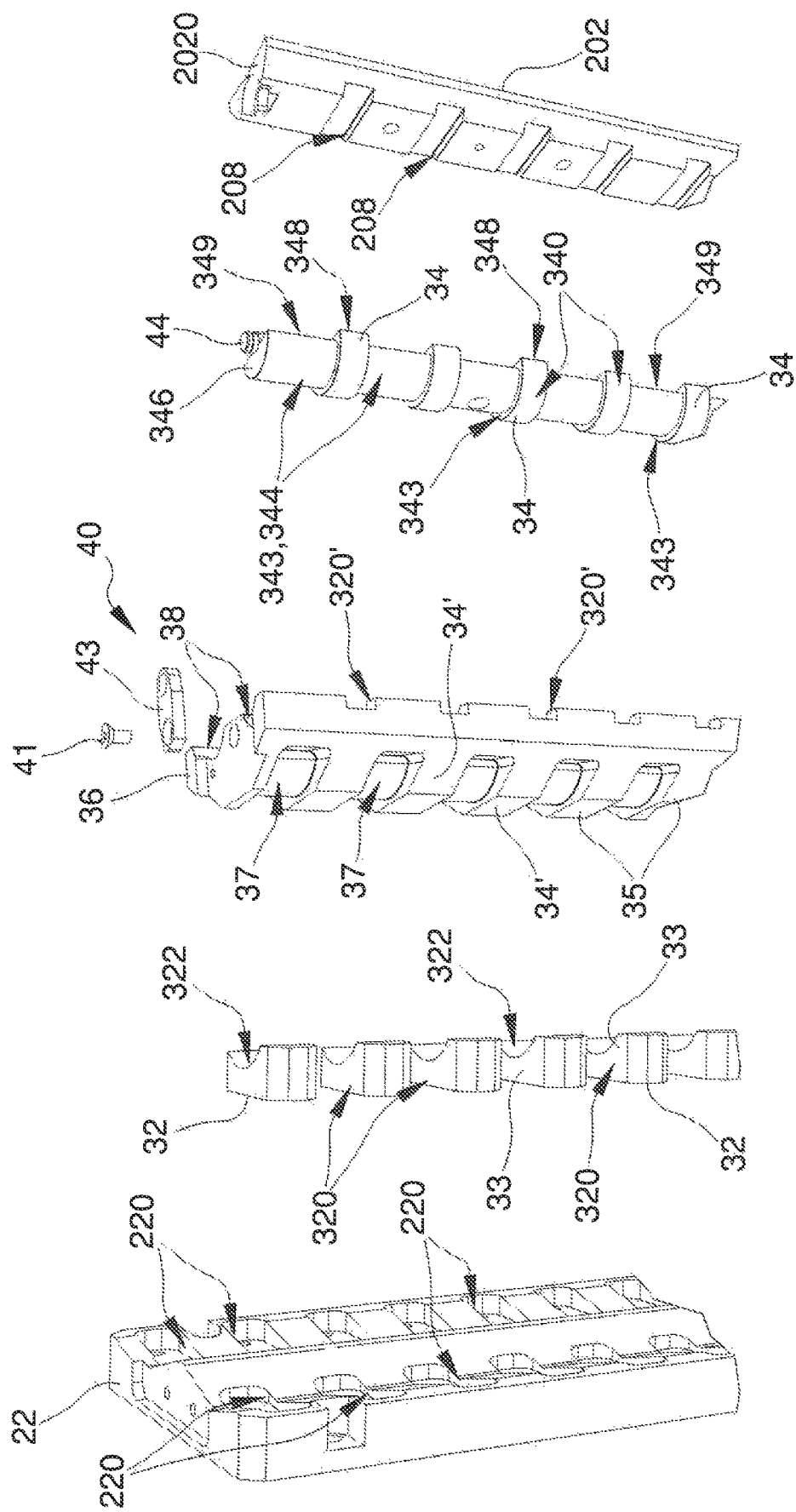
FIG. 8 is a second exploded view of FIG. 5 with parts not represented for clarity.
Figure 14:
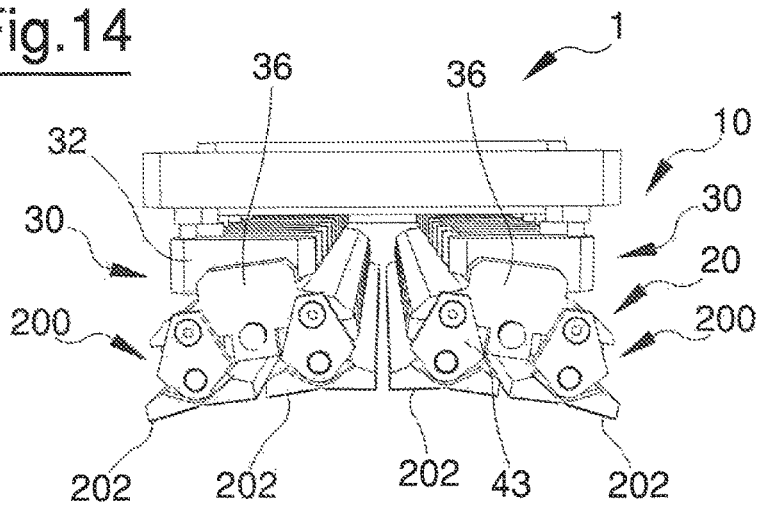
FIG. 14 is a first plan view of FIG. 13 with parts not represented for clarity.
Figure 15:
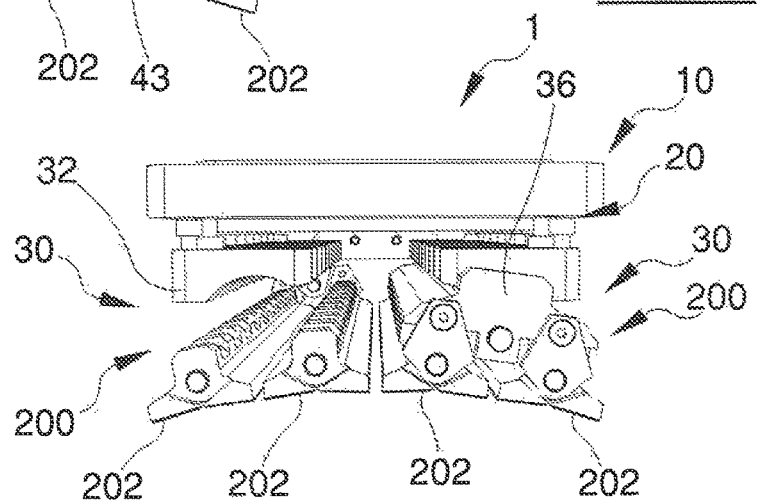
FIG. 15 is a second view of FIG. 13 with parts not represented for clarity.
Figures 16, 17:
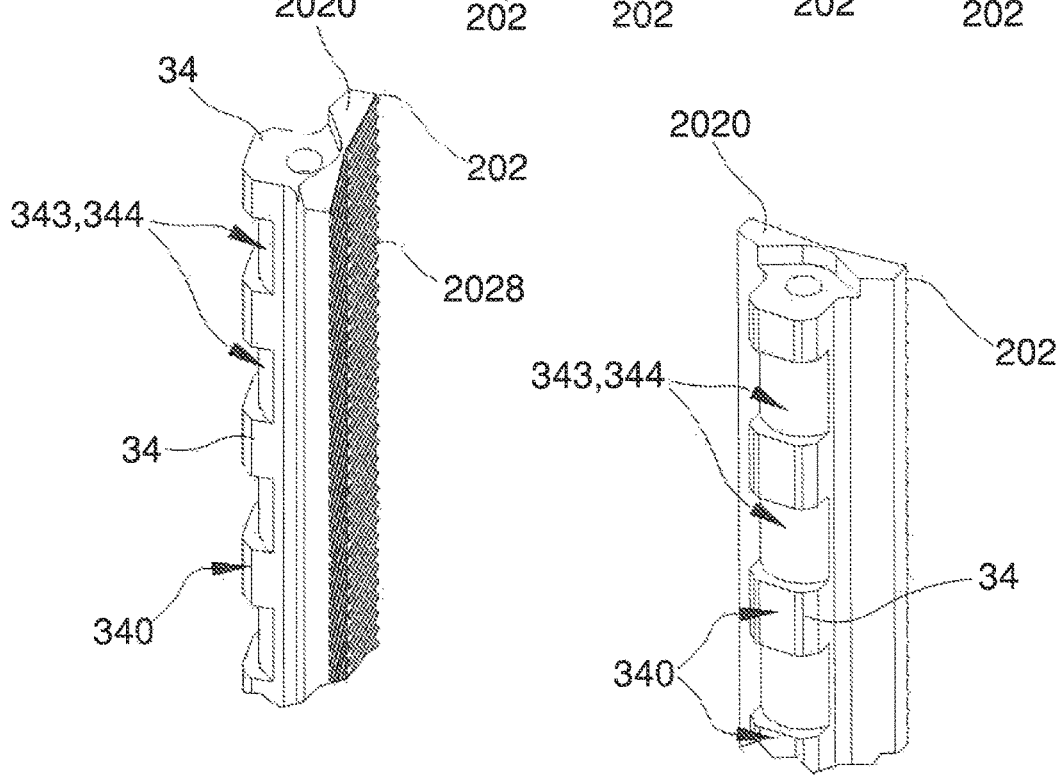
FIG. 16 is a schematic and three-dimensional front view of a second detail taken from FIG. 14.
FIG. 17 is a schematic and three-dimensional rear view of FIG. 16.

With reference to FIGS. 6-11 the ribbed body 36 has dual rear abutment elements 34' of the abutment elements 34 of the elongated member 346 interspersed at regular intervals with dual recesses 37 of the second compartments 343 of the elongated member 346. Moreover, in this version the ribbed body 36 has at the front compartments 320' and concave seats 322' (FIG. 9) obtained in the ribbed body 36 and respectively equivalent to the first compartments 320 associated with the plate 22, which in the solution of FIGS. 2 and 3 housed the abutment elements 34, and to the concave seats 322 of the tabs 32, which in FIGS. 2 and 3 coupled to the second compartments 343. FIGS. 8, 10 and 11 show flat front surfaces 348 of the abutment elements 34, interspersed by other flat front surfaces 349, and respective flat seats 208 made at the rear and arranged regularly spaced in the sliding blocks 202 of this version.

FIGS. 12 and 13 show a further construction variant of the present invention, in particular of the embodiment represented in FIGS. 4 and 5, according to which each sliding block 202 incorporates in a single piece the elongated member 346. This solution is better seen in FIGS. 14-17, in which the construction characteristics of the ribbed body 36 and of the sliding block 202 that incorporates the elongated member 346 can be viewed. Naturally, in this case the abutment elements 34 and the second compartments 343 of the elongated member 346 are incorporated in the sliding block 202 at the rear.

According to the above description, the clamp 1000 according to the present invention and each of the gripping devices 1 of which it is composed solve the problem of minimizing the impact determined by applying radial force on the external sheath of each body CA held due to the holding units 200 whose sliding blocks 202 can be orientated freely also based on the deformation effectively shown by the body CA being gripped on an extension that is substantially identical to that of each gripping device 1, and hence of the clamp 1000 that comprises it. In this way the uniformity of the pressure applied radially to the segments of body CA subjected to application of radial load to be held, and consequently the capacity to withstand axial loads is maximized and deterioration of the body CA and of the respective external sheath is limited. Moreover, the distribution of the axial load on a plurality of pairs consisting of a tab 32 and an abutment element 34, through the contact determined with the side surfaces 33 along the entire axial extension of the plate 22, and consequently according to the above description also for the entire axial extension of the sliding blocks 202, allows the specific pressure in the contact between the tabs 32 and the abutment elements 34 to be limited, and consequently the radial dimension of the gripping assemblies 20, and hence of the gripping devices 1 as a whole, to be limited.

The invention claimed is:

1. A gripping device for a clamp having a central axis (AX) and extending in a direction (D) parallel to the central axis (AX), the gripping device being designed to axially block an axisymmetric body by applying radial actions centered on the central axis (AX), the gripping device comprising:
   a support assembly and a gripping assembly coupled together by a plate that delimits the gripping assembly at a rear thereof, the gripping assembly including at a front, at least one holding unit, each holding unit including: i) at least one toothed sliding block carried so as to be freely rotatable while axially fixed with respect to said direction (D), ii) hinge coupling elements axially distributed along said direction (D) and arranged between the plate and each said sliding block, wherein the hinge coupling elements include tabs carried by the plate and abutment elements carried at the rear of the sliding block and shape-fitted to the tabs;
wherein each tab has at a front a concave seat with a cylindrical shape, and the abutment elements are axially distributed and delimit longitudinally, two-by-two, a second compartment, which is in turn transversally delimited by a partially cylindrical sheath concentric with a fulcrum axis and has an angular extension that approximates the concave seat.

2. The gripping device according to claim 1, wherein the tabs are removable from the plate and define a plurality of axial abutment surfaces that axially delimit first compartments distributed along said direction (D) for the abutment elements, wherein each abutment element is delimited by a surface facing the plate.

3. The gipping device according to claim 1, further comprising radial reference members, which are designed to hold the plate and gripping assembly in position and comprise a pair of lids coupled to the plate at ends of the plate on longitudinally opposite sides, and a pair of pins, which engage each sliding block in respective end portions coaxially with the fulcrum axis.

4. The gripping device according to claim 3, wherein the hinge coupling elements each comprise an elongated member that incorporates at a rear the abutment elements and the second compartments, each hinge coupling element being made in a single piece with, or is rigidly coupled to, the sliding block on the side of the plate.

5. The gripping device according to claim 4, wherein said hinge coupling elements comprise a ribbed body interposed between said plate and said sliding block, the ribbed body being shaped for hinged coupling with the plate and with the elongated member and between the tabs and the abutment elements.

6. The gripping device according to claim 5, wherein said ribbed body has, at the rear, third toothed members each of which being designed to engage a first compartment and a recess for enabling shape fitting with the concave seat and, at the front, a plurality of housings each housing being shaped in a way similar to the first compartment for housing the abutment element.

7. The gripping device according to claim 1, wherein each said tab is made of steel or a material with antifriction characteristics if, in use, it is coupled to steel; said abutment elements being made of steel or of a material with antifriction characteristics if, in use, they are coupled to steel.

8. A clamp for blocking an axisymmetric body (CA) axially by applying radial actions, the clamp comprising a plurality of gripping devices according to claim 1 distributed concentrically about an axis (AX) and developing in a given direction (D), each gripping device having a support assembly and a gripping assembly coupled by a connection element, a driving assembly for each said gripping device, each said driving assembly being designed to alternatively move the respective said support assembly between a retracted inactive position and an advanced active position transversal to said given direction, each said gripping device further having a supporting member coupled to a respective said driving assembly via a ball joint.

9. A gripping device for a clamp having a central axis (AX) and extending in a direction (D) parallel to the central axis (AX), the gripping device being designed to axially block an axisymmetric body by applying radial actions centered on the central axis (AX), the gripping device comprising:
   a support assembly and a gripping assembly coupled together by a plate that delimits the gripping assembly at a rear thereof, the gripping assembly including at a front, at least one holding unit, each holding unit including: i) at least one toothed sliding block carried so as to be freely rotatable while axially fixed with respect to said direction (D), ii) hinge coupling elements axially distributed along said direction (D) and arranged between the plate and each said sliding block, wherein the hinge coupling elements include tabs carried by the plate and abutment elements carried at the rear of the sliding block and shape-fitted to the tabs;

The gripping device according to claim 1, wherein each said sliding block is delimited at a front thereof by a face provided with a plurality of teeth arranged transversally to said given direction (D) for the entire transversal extension of said sliding block, each said tooth having a triangular or rectangular, cross-section.

10. The gripping device according to claim 9, wherein said face has a prismatic or concave or convex shape and has at the front at least two longitudinal portions, each said longitudinal being flat or convex or concave and having a longitudinal extension that is substantially identical to a longitudinal extent of said plate.

\* \* \* \* \*